United States Patent [19]

Dotti et al.

[11] Patent Number: 4,497,164
[45] Date of Patent: Feb. 5, 1985

[54] APPARATUS FOR MANUFACTURING AN OPTICAL FIBER CABLE WITH OPTICAL FIBERS IN GROOVES IN THE CABLE CORE

[75] Inventors: Enrico Dotti; Beniamino Mariani, both of Milan, Italy

[73] Assignee: Societa'Cavi Pirelli S.p.A., Milan, Italy

[21] Appl. No.: 497,846

[22] Filed: May 25, 1983

[30] Foreign Application Priority Data

May 31, 1982 [IT] Italy .................................. 21585 A/82

[51] Int. Cl.³ .......................... G02B 5/16; H01B 13/02
[52] U.S. Cl. .............................................. 57/6; 57/9; 57/13; 57/352
[58] Field of Search .................... 57/6, 7, 9, 13–15, 57/352

[56] References Cited

U.S. PATENT DOCUMENTS

| 4,195,468 | 4/1980 | King et al. | 57/9 |
| 4,347,697 | 9/1982 | Hope et al. | 57/9 |
| 4,384,446 | 5/1983 | Hope et al. | 57/6 |
| 4,388,799 | 6/1983 | Vives | 57/6 |
| 4,395,869 | 8/1983 | Priaroggia et al. | 57/13 |
| 4,411,130 | 10/1983 | Dubois et al. | 57/13 X |

FOREIGN PATENT DOCUMENTS

| 20189 | 12/1980 | European Pat. Off. |
| 2023060 | 12/1979 | United Kingdom |
| 2064808 | 6/1981 | United Kingdom |

Primary Examiner—John Petrakes
Attorney, Agent, or Firm—Brooks Haidt Haffner & Delahunty

[57] ABSTRACT

Apparatus for inserting optical fibers into helical grooves in a plastic core advanced through a rotatable, rigid body which has conduits for guiding the fibers from bobbins mounted on a rotatable cage into the grooves, the ends of the conduits engaging the walls of the grooves which cause the body to rotate as the core is advanced, said apparatus having drive means for advancing the core separate from the drive means for the rotatable cage and having detecting and control means for detecting angular and direction of rotation differences between the cage and the rigid body and correcting such differences by control of the rotation of the cage by its drive means.

9 Claims, 6 Drawing Figures

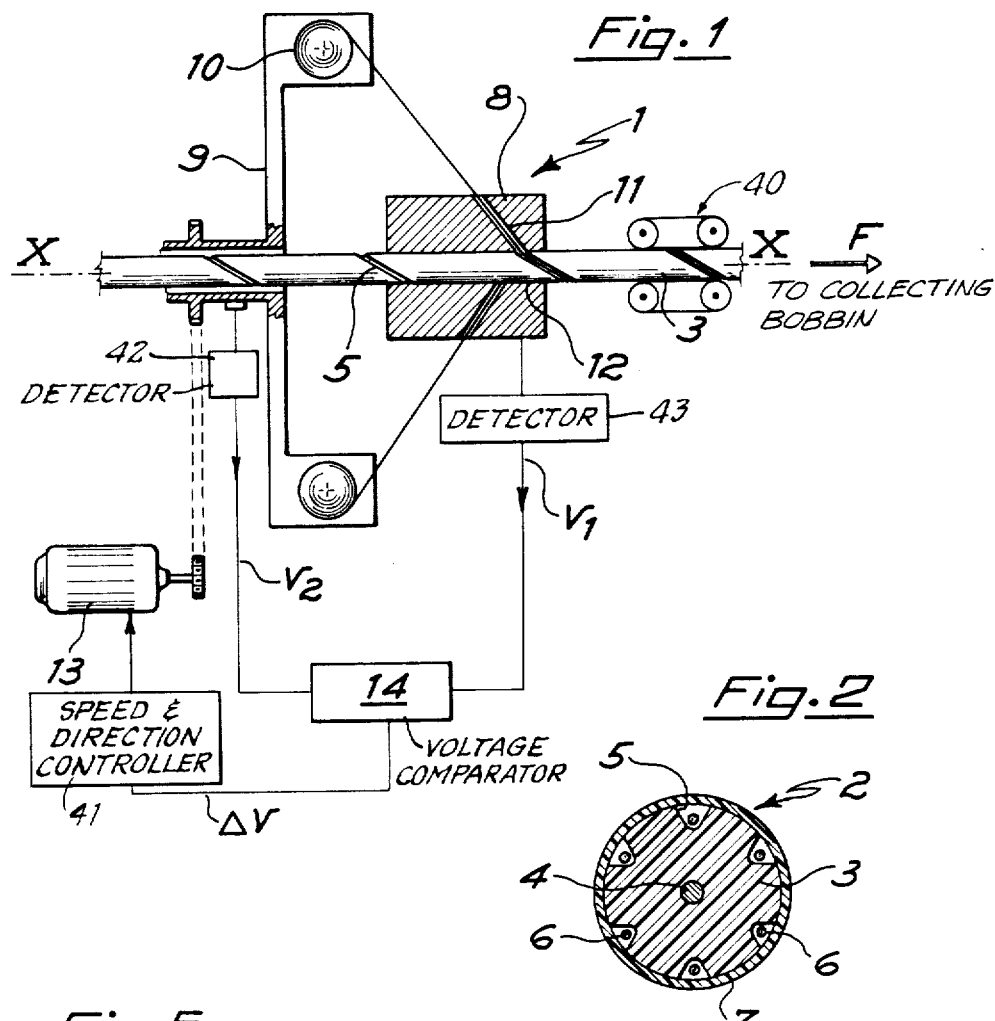
Fig. 1
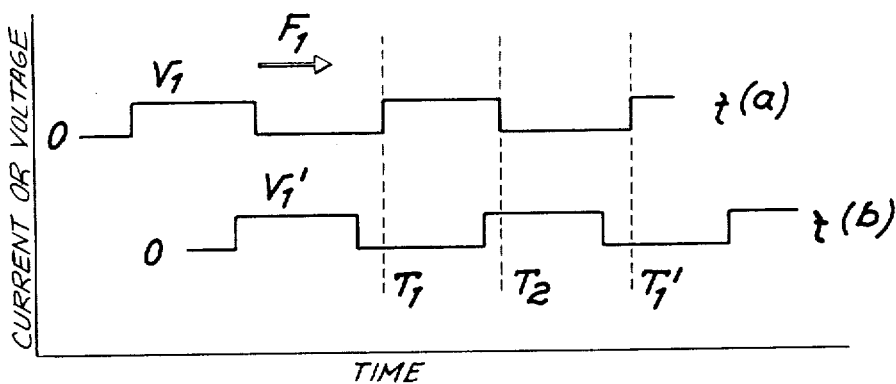
Fig. 2
Fig. 3

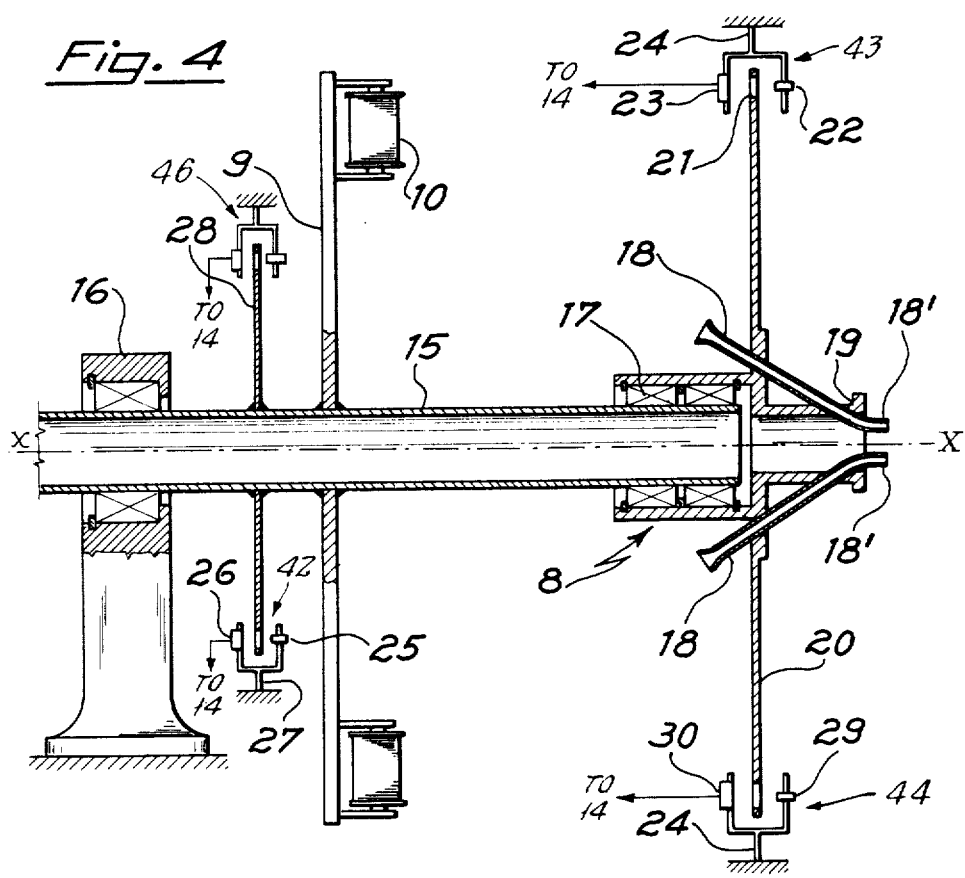
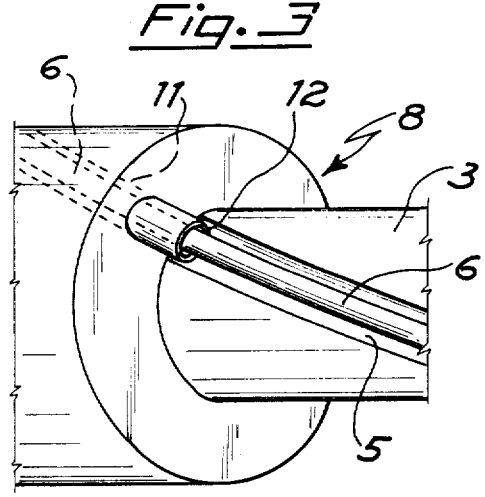
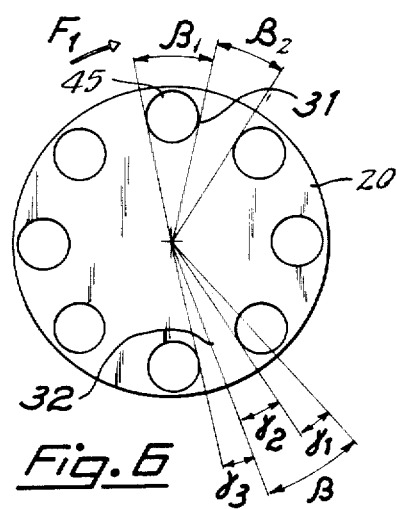

APPARATUS FOR MANUFACTURING AN OPTICAL FIBER CABLE WITH OPTICAL FIBERS IN GROOVES IN THE CABLE CORE

The present invention relates to an apparatus for manufacturing a cable comprising optical fibers, for example, a telecommunication cable.

More particularly, the invention relates to apparatus for correctly introducing optical fibers into the helical grooves in a plastic core as it is moved in a predetermined direction.

Processes for manufacturing said cable, comprising the following steps are already known:

advancing the plastic core through the cavity of a rigid body with axis coincident with the axis of said core, the surface of said cylindrical cavity being provided with tongues directed radially and in number at least equal to the number of said grooves;

engaging said tongues with said grooves to provide between core and rigid body a coupling of female thread screw type;

feeding said rigid body with optical fibers through through-holes at each tongue and entering said cylindrical cavity in an inclined direction with respect to the axis of said cylindrical core.

In particular, in the cited process the female thread screw type of coupling is obtained by leaving the rigid body free to rotate around its own axis, the feeding apparatus of the optical fibers also rotating simultaneously around this axis and translating the core through the said cavity. A process and apparatus of this type is described in U.S. application Ser. No. 350,025, filed Feb. 18, 1982, now U.S. Pat. No. 4,395,869, and entitled "Method and Apparatus for Making Optical Fiber Cable Element".

The feeding apparatus of the fibers is constituted by a plurality of bobbins which are properly braked during the unwinding of the fibers and which are mounted on a suitable supporting structure or a bobbin-carrier cage.

The cited process and the associated apparatus are satisfactory for many purposes. However, from experiments, it has been found that there are unexpected and undesired deviations in the geometry of the grooves of the core with respect to the desired theoretical path. In fact, sometimes heretofore unappreciated variations of the pitch of the helix of each groove have been found which probably are due to unavoidable working tolerances.

A further possible variation in the helical pitch of the groove could take place in those cases in which the core, already formed with the grooves, is first collected around a suitable bobbin to be then unwound during the cable manufacture.

In these cases it is possible to hypothesize that the core, during the formation of the helical grooves, can have undergone torsion tending to remain in the winding step of the core on the suitable collecting bobbin. Subsequently, in the unwinding step of the core from the collecting bobbin and in the advancing step toward the cylindrical body for the insertion of the fibers, more or less forced detorsions could occur with consequent small and uncontrollable variations of the pitch of the helical grooves.

As is understandable from the above-explained conditions, during the cable manufacturing process when the core advances with a constant speed, the rigid body engaged with the core through the tongues will still rotate, but with the pitch of the grooves being changed, the rotation of the rigid body will never be constant with time. In this situation, if the cage, to which the bobbins for feeding the fibers are connected, cannot conform itself immediately to the variations of the number of revolutions of the rigid body with time, this latter having a considerably smaller mass than that of the cage, the optical fiber will break in consequence of the excessive tensile stresses or, more generally, bending stresses.

Therefore, the present invention has, as one object, the providing of apparatus for manufacturing a cable comprising a plastic core having one or more helical grooves, each of the grooves being provided with at least one optical fiber, said apparatus comprising a system for inserting an optical fiber into the relative groove of the core in a correct way even in the presence of variations of the pitch of the groove.

The principal object of the present invention is an apparatus for manufacturing a cable comprising a plastic core having one or more helical grooves, each of the grooves being provided with at least one optical fiber. Said apparatus comprises, along one axis of rotation, a bobbin-carrier cage, an optical fiber being wound on each of said bobbins, a rigid body comprising cavities corresponding in number to the fibers for guiding each fiber toward said core as it passes through the center of the cage along said axis of rotation, each cavity being provided with tongues or the like directed transversely to the core and engaged in said grooves to determine between core and rigid body, a coupling of female-thread screw type, and a first driving group for pulling said core from the center of the cage toward said rigid body, said apparatus being characterized by the fact of comprising a second driving group for the cage mechanically separate from said first driving group, and means for comparing the angular position of the cage with respect to the angular position of the rigid body, said comparing means being connected to said second driving group to compensate for phase displacements of the cage with regard to the rigid body.

Therefore, the present invention is based on the principle that the drive for the advancing of the core through the rigid body is separate from and independent of the drive for the rotation of the structure which carries the bobbins for feeding the fibers. In this way, as will be explained hereinafter in more detail, during the manufacture of the cable, when there is any variation of the pitch of the groove, which variation the rigid body follows, it will be possible to adjust the drive of the structure on which the bobbins for feeding the fibers are mounted, for example, a bobbin carrier cage, causing said structure to rotate at a rate corresponding exactly to rotation of the rigid body.

The second principle on which the invention is based is the one relating to the adjustment of the drive of the bobbin cage, the principle is based on using comparing means appropriate for revealing any angular phase displacement between the rigid body and the cage caused by the variations of the pitch of the core grooves. Said comparing means are connected (linked) to the drive for the cage in order to nullify any angular phase displacement between the rigid body and the cage through the emission of a suitable correction signal.

The combination of the two stated principles causes the cage to faithfully follow the movements of the rigid body involved in the passage of the core through its central cavity. In other words, owing to the presence of the two cited principles, the rigid body guides, continuously, the bobbin-carrier cage effectively providing a connection equivalent to a rigid connection. Consequently, there is accomplished, at all times, the absence of tractive and compression forces on the fibers and, in general, of forces transverse to the fiber tending to divert its insertion into the proper seat in the groove of the core.

Other objects and advantages of the present invention will be apparent from the following detailed description of the presently preferred embodiments thereof, which description should be considered in conjunction with the accompanying drawings in which:

FIG. 1 is a schematic diagram of a preferred embodiment of the apparatus of the invention;

FIG. 2 is a transverse section of a cable produced with the apparatus shown in FIG. 1;

FIG. 3 is an enlarged, fragmentary, perspective view of the rigid body shown in FIG. 1;

FIG. 4 is a view, in longitudinal section, of a portion of the preferred embodiment shown in FIG. 1;

FIG. 5 is a graph illustrating voltages generated by detecting devices employed with the preferred embodiment of the apparatus of the invention; and FIG. 6 is a front view of a shutter employed in part of the detecting devices shown in FIG. 4.

With reference to FIG. 1, the apparatus 1 is suitable for manufacturing a cable 2 (FIG. 2) comprising a core 3 of plastic material which may be reinforced with a wire, cord or the like 4 of steel and which is provided with helical grooves 5, at least one helical fiber 6 being inserted in each of said helical grooves. The cable is externally lapped with a plastic tape 7.

The apparatus 1 comprises first driving means 40 (FIG. 1) to advance the core 3 in the direction X—X and in the sense F, a rigid body 8 provided with a central cavity through which the core 3 passes, a bobbin-carrier cage 9 for feeding the optical fibers which are unwound from the bobbins 10 and directed through guides 11 of the rigid body 8 into the helical grooves of the core 3.

The means for applying the protective layer 7 and the first driving means 40 are of a known type. In particular, the first driving means could be constituted by a caterpillar, as illustrated schematically in FIG. 1, or also by the bobbins used for unwinding and collecting the core upstream and downstream of the apparatus of FIG. 1.

The rigid body 8 comprises means suitable for providing a female-thread screw coupling with the grooves of the core 3. FIG. 3 illustrates the coupling means for only one groove. Said means, of a known type, can be constituted, for example, by tongues 12 arranged at the end of the guides 11 and directed into the helical grooves 5.

The cage 9 is rotated around the axis X—X by a second driving group comprising (FIG. 1) a motor 13 mechanically independent of the first driving means. The motor 13 is, for example, a direct current motor and is provided with the usual electrical circuits 41 for example the one shown at page 157 of the book "elettronica di potenza" published on 1976 by Editoriale Delfino for the adjustments of the direction and speed of rotation.

The apparatus comprises comparator of a known type, means 14, for example the one shown at page 72 of the book "electronica di potenza" published on 1976 by Editoriale Delfino for comparing the angular position of the cage 9 with respect to the angular position of the body 8, the rectangle designated with the reference numeral 14 representing any device able to provide a signal corresponding to angular phase displacements between the cage 9 and the body 8, with respect to a predetermined starting position. The comparator 14 may, for example, contain electric circuits of "logic" type using transistors which provide the signal or not depending on the arrival or not at its input of signals of sufficient voltage value. The means 14 normally also comprises amplification elements to sufficiently raise the value of the signals to be transmitted to the device to be controlled.

Said comparator means 14 are connected to the speed and direction controller 41 for the motor 13 to compensate for the angular phase displacements of the cage 9 with regard to the rigid body 8. In practice, the comparing means comprise two detectors 42 and 43, for example the one shown at page 229 of the book "elettronica di potenza" published on 1976 by Editoriale Delfino, one coupled to the cage 9 and the other, to the body 8. Each detector 42 and 43 is then sensitive to the number of revolutions in units of time of the parts to which it is coupled and transmits to the comparator 14 electric signals of voltage $V_1$ and $V_2$ in the form of impulses. The resulting signal, $\Delta V$, is transmitted to the controller 41.

The detectors 42 and 43 may comprise, for example, a plurality of reference elements distributed in circumferential sense on appropriate supports integral with the rotating element and a sensor fixed and opposite to the rotating support for counting the number of reference elements as they pass by a detecting element.

In the preferred embodiment, the apparatus 1 comprises (FIG. 4) a bobbin-carrier cage 9 secured at its center to a hollow shaft 15 supported 9 in the bearing supports 16a of a fixed frame 16. The rigid body 8 is carried on bearing supports 17 at one end of the shaft 15 and is free to rotate on the shaft 15.

In one of many possible embodiments, the body 8 is formed by a plurality of small tubes 18 of steel, corresponding to the guides 11 of FIG. 1, engaging with the grooves of the core 3 through the end parts 18'. The small tubes 18 are connected to one another through a sleeve shaped metallic structure 19, for instance, of aluminum, subdivided into two parts having different section, of which the greater one bears against the bearing supports 17. Alternatively, said two parts of the metallic structure could be realized with equal transversal sections.

In vertical relation to the axis X—X on the body 8, there is mounted a thin circular plate 20 provided at radial positions with a plurality of slots 21. On opposite sides of the plate 20, along the circular trajectory run by the slots 21 when the body 8 rotates around the axis X—X, there are mounted a light sender element 22 and a light sensitive element 23 forming, as a whole, a photoelectric cell type device secured to a fixed structure 24.

The light sensitive element 23 is connected to the comparing means 14 (FIG. 1) to which it transmits, during the rotation of the plate 20, electric impulses, for example, of the type represented in the diagram (a) of FIG. 5. Diagram (a) indicates, in relation to the time t, a plurality of square waves with a single and predetermined voltage or current value. The maximum values of the waves are separated from one another by a null value, or of value lower than the maximum values, determined by the interruption of the passage of light between the elements 22, 23 on the rotation of the plate 20.

Preferably, the angle formed by two contiguous slots 21 on the plate 20 is less than, or at the most equal to, 5° to obtain an immediate indication of the phase displacements.

Similarly, the device sensitive to the rotation of the cage 9, or detector 42, comprises a photoelectric cell group formed by a light sender element 25 and a light sensitive element 26 mounted on a fixed structure 27 and a rotating plate 28 secured to the shaft 15 and provided with a plurality of through slots which pass, in succession, between the sender-receiver group 25 and 26. This photoelectric cell group transmits the impulses $V_2$ (FIG. 1), similar to the pulses $V_1$, to the comparing means 14.

If it is desired to determine the sense of rotation, the apparatus for controlling the rotation of the body comprises means for taking into account the sense of rotation of the plate 20. This function is particularly advantageous in the cases in which the core is provided with grooves formed in such a way as to make the rigid body 8 make alternate rotations in regular succession, first in one sense and then in the opposite sense. In this embodiment, the apparatus comprises a further photoelectric cell group 44 angularly offset with respect to the first group 43 and formed by a light sender 29 and a light sensitive element 30.

In this latter embodiment, the rotation of the plate 20 in alternate senses generates, in time, two square wave signals $V_1$ and $V'_1$ (FIG. 5) which are both supplied to the comparing means 14.

Since the methods of using the signals supplied by the detectors 42–44 to control speed and direction of rotation of the motor 13 are known to those skilled in the field of motor control, only a summary, by way of example, of one of the many possible methods of operation of the two photoelectric cell groups 22–23 and 29–30 with the disc 20 to control the motor 13 will be described. Thus, with reference to FIG. 6:

when the light of the sender 22 of the first photoelectric cell group begins to cross the slot 45 at point 31 and sensitizes the receiver 23, the light of the sender 29 does not cross the opening of any slot, but strikes, at point 32, against the solid wall of the disc 20 and of course it cannot sensitize the receiver 30.

Moreover, in the example of FIG. 6, the disc provides an equal distribution between slot area and solid area with the area of each slot characterized by an angle $\beta_1$ equal to the angle $\beta_2$ between two contiguous slots. The distribution between slot area and solid area could be different from that described, but for explanation purposes, the arrangement shown in FIG. 6 is assumed.

In this situation, the signals produced by the light directed on the two receivers 23 and 30 of the two photoelectric cell groups are offset, and the two waves $V_1$ and $V'_1$ supplied to the comparator are also offset.

The generation of the signals $V_1$ and $V'_1$ will be understood from the following explanation. When the disc 20, starting from the moment $T_1$, rotates in the sense of the arrow $F_1$ (FIG. 6) making an angular movement $\beta$, a signal $V_1$ (FIG. 5) of maximum value will be transmitted from the first receiver 23 to the comparator 14 whereas the receiver 30 of the second photoelectric cell group will transmit first a signal $V'_1$ of minimum value for an angular movement $\gamma_1$ equal to a fraction of the angle $\beta$ and then, a signal of maximum value when the disc rotates through an angle $\gamma_2$ completing thus the total angular movement $\beta$.

Since the alternating of solid areas and slot areas is regularly distributed on the periphery of the disc, on rotation of the disc 20 in the sense $F_1$, there will take place the periodic repetition of the two signals $V_1$ and $V'_1$ shown in FIG. 5.

Assume the starting again from the time $T_1$ and the rotation of the disc 20 in opposite sense to $F_1$, the first receiver 23 will transmit a signal $V_1$ of minimum value to the comparator 14 for all the time corresponding to an angular movement $\beta_2$ because the light of the first sender 22 strikes the solid wall of the disc 20, whereas the second receiver 30 will transmit a signal of minimum value only for a fraction $\gamma_3$ of the angular movement $\beta$ since subsequently to the completion of rotation through said fraction of angle a signal will be generated by the light of the second sender 29. The two signals $V_1$ and $V'_1$ follow one another, in an obvious way, from point $T_1$ toward the left side as shown in FIG. 5.

Similarly, the disc 28 is associated with two photoelectric cell groups 42 and 46 which act in a similar manner, the said two photoelectric cell groups 42 and 46 having the function of sending impulses to the comparator 14 to correct the position of the cage 9 with respect to the disc 20.

In practice, as it will be explained in the operation of the apparatus, the comparator 14 receives through the rotation of the disc 20, two signals $V_1$ and $V'_1$, the first of which, through a known electric circuit is suitably modified and directed to circuits for adjusting the motor 13 in order to impose on the cage 9 the speed of the rigid body 8.

The second signal $V'_1$ is continuously compared with the first one to determine the sense of rotation of the rigid body 8 at any moment. The mutual relation of the two signals is made by observing the moment in which the signal $V_1$ assumes the maximum value on the wave front causing, for example, the closure of a contact in an electric circuit so that the existing voltage will cause circulation of current and by comparing such maximum value with the value of the signal $V'_1$ at that same moment.

For example, by supposing a rotation of the disc 20 in the sense so that the waves of FIG. 5 are, in effect, advancing toward the left side, the comparator 14, at the moment $T_1$, will compare the signal $V_1$ of maximum value, corresponding to the wave front, with the signal $V'_1$ arriving at comparator 14 at the same moment. As long as the sense of rotation is the same, the comparator 14, at regular intervals, will always compare the same values of signal $V_1$ and $V'_1$, as for instance, it can be observed at the moment subsequent to the time $T_1$. At time $T_2$, the comparator 14 does not compare the two signals since $V_1$ has a minimum value, or zero. At time $T_2$, the relation between the two signals is a signal $V'_1$ of minimum value corresponding to a signal $V_1$ of maximum value.

Suppose that the disc 20 is rotated in the opposite sense to the one just described, so that the waves of FIG. 5 are, in effect, advancing towards the right side. The comparator 14 at the moment $T_2$ will compare the signal $V_1$ of maximum value with signal $V'_1$ arriving at comparator 14 at that same moment. In this case the comparison will show two signals $V_1$ and $V'_1$ both of maximum voltage or current, and the comparator 14 recognizing a difference in the relation between the two signals, as compared to the previous relation, will cause the cage 9 to follow the new sense of rotation.

Two signals will arrive at comparator 14, similar to those shown in FIG. 5, but produced by the rotation of the disc 28 and by the presence of the two relative photoelectric cell groups 42 and 46. Also, in this case, the first of the two signals (designated with $V_2$ in FIG. 1) indicates the speed of the cage, while the second is compared with the first one to indicate the sense of rotation of the cage 9 and to cause corrections in the sense of rotation of the cage as may be required.

The operation of the apparatus will now be described.

The line is put into action by advancing at a constant speed the plastic core 3 through the rigid body 8 which will rotate around the axis X—X with a rotation rate determined by the female thread screw coupling of its tongues in the helical grooves which are distributed at constant pitch along the whole core 3.

Similarly, the cage 9 is rotated at a rate equal to that of the rigid body 8 since if it were not so, offset angular positions between bobbin-carrier cage 9 and rigid body 8 would make impossible the correct insertion of the fibers in the grooves with the risk of a rupture because of tensile forces and bending of the stressed fibers.

Consequently, at stationary conditions, the motor 13 is adjusted so as to have the cage 9 synchronous with the rigid body 8 when the line is put into action, and the two photoelectric cell groups, 43-44 and 42 and 46, associated with each of the two rotating parts, 20 and 28 are arranged so as to supply equal electric impulses to the comparator 14.

In this situation, the signal $\Delta V$ (FIG. 1) acting on the circuits for adjusting the motor 13 would be zero, or has such a value as not to vary the direction and speed of rotation of the cage 9.

Now, let it be assumed that there is a variation of the pitch of the grooves and there is a constant translation speed of the core 3.

In these conditions, whatever the cause of the variation may be, there will unavoidably be a variation of the rotation speed of the rigid body 8. Accordingly, the number of electric impulses $V_1$ per unit of time determined by the rotation of the plate 20, will vary and the comparator 14 will receive a signal different from the signal corresponding to grooves with constant pitch.

Since the signal arriving at the comparator 14 from the photoelectric cell group 42 (FIG. 4) associated with the cage 9 is temporarily unchanged at the comparator 14, there will be a difference signal, $\Delta V$, sent to the input of the circuit 14 for adjusting the motor 13 to vary the rate at which it drives the cage 9, so as to compensate the initial phase displacement between cage 9 and body 8.

Let it now be assumed that the core which is advanced comprises grooves which, in regular order, rotates the rigid body 8 first in one sense and then in the other.

At the moment at which the disc 20 reverses its rotation, the comparator 14 will still receive two signals $V_1$ and $V'_1$, but the electric circuit of the comparator 14, on comparing the first signal $V_1$ with the second signal $V'_1$, will recognize, for the reason explained before, the generation of a signal different from the previous one and will act immediately on the adjusting circuit 41 of the motor 13 to impose on cage 9 a reversal of the sense of rotation.

In turn, the disc 28 rotating in relation to the two photoelectric cell groups 42 and 46 will generate two signals, a first, $V_2$, and a second, $V'_2$, similar to $V_1$ and $V'_1$ and directed to the comparator 14. Hence, the first signal $V_2$, is put into relation with the second, $V'_2$, and if the final result is equal to that determined by the relation of the first signal, $V_1$, with the second, $V'_1$, it means that the cage 9 has followed the reversal of the sense of rotation of the rigid body 8 and the comparator 14 will not send further orders to the motor 13.

If, on the contrary to what has been stated, the comparator 14 finds a difference between the two results determined by comparing the two pairs of signals caused by the rotation of the disc 20 and 28, it means that the cage 9 has maintained the previous sense of rotation, and the comparator 14 will, in response to the comparison send a signal to the adjusting circuit 41 of the motor 13 to cause the cage to rotate in the same sense as the rigid body 8.

The present invention accomplishes the objects of the invention and has numerous advantages. In fact, as has been just demonstrated, the capacity of the control system of the apparatus of the invention is such as to guarantee always a correct introduction of the optical fibers into the grooves whatever the variation of the pitch of the grooves of the core may be.

As a further favorable result, the control system of the present invention does not produce any type of oscillation around the newly reached rate value. This favorable result depends on the fact that the principle of the invention provides action on only one involved magnitude, i.e. on the rotation of the cage, leaving unchanged the other magnitudes. In other words, when the control system detects an angular difference between the cage 9 and the rigid body 8, it acts only on the rotation of the cage 9 until the time that its rotation has become synchronous with that of the rigid body 8.

In these conditions, the corrective signal $\Delta V$ is null and is not further changed, and in the apparatus, there is, in effect, an interconnection equivalent to a rigid connection between cage 9 and body 8.

This soluton for safeguarding the integrity of the fiber, when placed on the seats of the grooves of the core, would not be obtained by having recourse to solutions that, at first sight, seem of easy and immediate application and that, for the most part, are based on the use of a single motor for the advancing of the core 3 and for the rotation of the cage 9 by means of a suitable transmission shaft and related gears.

In fact, in order to obviate problems due to the variations of the pitch of the core grooves, it would be thought that one should use a single motor to thereby vary the revolutions of the cage in synchronism with the revolutions of the rigid body. However, since there is only one advancing and rotation control, there is a corresponding variation of the advancing speed of the core 3 with a not desired, consequent and unavoidable second variation of rotation of the rigid body 8. In short, by means of this latter system, the cage 9 would not succeed in synchronizing with the rigid body.

The embodiment of the apparatus shown in FIGS. 3 and 4 produces the advantage of requiring a minimum driving means for the rotation of the rigid body 8. In fact, the small tubes 18, which are, in practice, capillaries having a diameter slightly greater than that of the optical fibers, are inserted into a hollow structure on which a plate 20, having a very thin thickness, e.g. less than one millimeter, is carried.

For the above explained reasons, the structure of the body 8 has an insignificant mass whereas the mass of the cage 9 is much greater.

Further, all the rigid body 8 is carried by bearing supports 17, and therefore, the friction may be completely disregarded under the conditions of rotation. Therefore, the rigid body 8 offers a modest resistance which must be overcome when the core 3 is advanced.

Consequently, since the force to be transmitted for the rotation of the rigid body 8 is very small, there should not be any risk of a deforming effect on the small tubes 18 which engage their end parts 18' with the walls of the core grooves, and in this way, the optical fibers inside the small tubes 18 are protected from dangerous mechanical stresses.

Moreover, for the small mass represented by the rigid body 8, any variation of the pitch of the groove of the core 3, advancing rectilinearly, will immediately result in a corresponding variation of rotation of the rigid body 8, producing immediate corresponding corrections in the rate of rotation of the cage 9.

The rotation proposed by the present invention differs, therefore, and favorably, from other possible solutions comprising, for instance, a speedometer dynamo, which does not have a completely disregardable weight, associated with the rigid body 8 to transmit the rate of rotation to the comparing means 14.

A further advantage of the apparatus of FIG. 4 is provided by the mounting of the whole rigid body 8 on the shaft 15 on which the cage 9 is mounted. In fact, in this case, there is obtained a greater simplicity in construction since the placing of the rigid body 8 on a further, its own, supporting structure separate from the feeding device for the optical fibers is avoided.

The described apparatus can also be used for applications different from those illustrated and described. For example, it can be used to insert other types of filaments, such as, conductors, or in general, thread-like elements, instead of optical fibers into the grooves of a core, or the apparatus can be used to make cables, in particular, cables for optical fibers in which the helix of each groove has an alternate path, known to those skilled in the art as S-Z shaped configuration, in which, for instance, a series of convolutions wound in one sense follows a series of convolutions wound in opposite sense.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. Apparatus for manufacturing a cable comprising a core having one or more helical grooves, each groove having at least one filament in each groove, said apparatus comprising a rotatable bobbin-carrier cage for carrying the filament or filaments, a rotatable rigid body mounted in spaced relation to said cage and with its axis of rotation aligned with the axis of rotation of said cage, said rigid body being rotatable around said axis with respect to said cage and said rigid body having an opening through which said core may be passed and said rigid body comprising conduits equal in number to the number of grooves for directing each fiber toward said core and into a groove as the core passes through said opening in said rigid body, means adapted to extend into said grooves and engage the walls of said grooves and connected to said rigid body for causing said rigid body to be rotated by said groove walls as said core passes through said opening in said rigid body, a first driving means for advancing said core through said opening in said rigid body, second driving means mechanically separate from said first driving means for rotating said cage, means for comparing the angular position of said cage with the angular position of said rigid body, and control means connected to said comparing means and responsive thereto and connected to said second driving means for reducing any difference between the angular position of said rigid body and the angular position of said cage.

2. Apparatus as set forth in claim 1, wherein said comparing means comprises a first detector responsive to the rotation of the cage for generating electrical signals indicating the speed of rotation of said cage, a second detector responsive to the rotation of the rigid body for generating electrical signals indicating the speed of rotation of said rigid body and a comparator connected to said first detector and to said second detector for providing an output signal corresponding to any difference between the speeds of rotation of said cage and said rigid body.

3. Apparatus for manufacturing a cable comprising a core having one or more helical grooves, each groove having at least one filament in each groove, said apparatus comprising a rotatable bobbin-carrier cage for carrying the filament or filaments, a rotatable rigid body mounted in spaced relation to said cage and with its axis of rotation aligned with the axis of rotation of said cage, said rigid body having an opening through which said core may be passed and said rigid body comprising conduits equal in number to the number of grooves for directing each fiber toward said core as it passes through said opening in said rigid body, means engageable with said grooves and connected to said rigid body for causing said rigid body to rotate as said core passes through said opening in said rigid body, a first driving means for advancing said core through said opening in said rigid body, second driving means mechanically separate from said first driving means for rotating said cage, means for comparing the angular position of said cage with the angular position of said rigid body, and control means connected to said comparing means and responsive thereto and connected to said second driving means for reducing any difference between the angular position of said rigid body and the angular position of said cage, said comparing means comprising a first detector responsive to the rotation of the cage for generating electrical signals indicating the speed of rotation of said cage, a second detector responsive to the rotation of the rigid body for generating electrical signals indicating the speed of rotation of said rigid body and a comparator connected to said first detector and to said second detector for providing an output signal corresponding to any difference between the speeds of rotation of said cage and said rigid body and said first detector comprising first means rotatable with said cage and said second detector comprising second means rotatable with said rigid body, each of said first means and said second means having a plurality of reference elements thereon distributed in spaced relation circumferentially of the axis of rotation of said cage and said rigid body and said first detector further comprising sensing means adjacent said first means for sensing the passage of the reference elements on said first means thereby and said second detector further comprising sensing means for sensing the passage of the reference elements on said second means thereby.

4. Apparatus as set forth in claim 3, wherein each of said first means and said second means is a disc and said reference elements are light transmitting openings in each disc, wherein each of said sensing means is light responsive and wherein each of said detectors comprises means for transmitting light through the openings in the respective discs.

5. Apparatus as set forth in claim 4, wherein the angle between said openings, as measured from the axis of rotation, is not greater than 5°.

6. Apparatus as set forth in claim 4, wherein each said disc, said rigid body and said cage are mounted on a common shaft, wherein one said disc and said cage are secured to said shaft for rotation therewith, wherein said rigid body is rotatable on said shaft, wherein the other said disc is secured to said rigid body for rotation therewith and wherein said second driving means is connected to said shaft for rotation thereof.

7. Apparatus for manufacturing a cable comprising a core having one or more helical grooves, each groove having at least one filament in each groove, said apparatus comprising a rotatable bobbin-carrier cage for carrying the filament or filaments, a rotatable rigid body mounted in spaced relation to said cage and with its axis of rotation aligned with the axis of rotation of said cage, said rigid body having an opening through which said core may be passed and said rigid body comprising conduits equal in number to the number of grooves for directing each fiber toward said core as it passes through said opening in said rigid body, means engageable with said grooves and connected to said rigid body for causing said rigid body to rotate as said core passes through said opening in said rigid body, a first driving means for advancing said core through said opening in said rigid body, second driving means mechanically separate from said first driving means for rotating said cage, means for comparing the angular position of said cage with the angular position of said rigid body, control means connected to said comparing means and responsive thereto and connected to said second driving means for reducing any difference between the angular position of said rigid body and the angular position of said cage, said comparing means comprising a first detector responsive to the rotation of the cage for generating electrical signals indicating the speed of rotation of said cage, a second detector responsive to the rotation of the rigid body for generating electrical signals indicating the speed of rotation of said rigid body and a comparator connected to said first detector and to said second detector for providing an output signal corresponding to any difference between the speeds of rotation of said cage and said rigid body, said rigid body being rotatable around said axis with respect to said cage and a third detector for generating electrical signals indicating the direction of rotation of said cage, and a fourth detector for generating electrical signals indicating the direction of rotation of said rigid body, said comparator and being connected to said third detector and to said fourth detector for providing an output signal when the directions of rotation of said cage and said body are different and said control means being responsive to said last-mentioned signal for changing the direction of rotation of said cage.

8. Apparatus as set forth in claim 1, wherein said second driving means comprises a variable speed, direct current motor.

9. Apparatus as set forth in claim 1, wherein said filament is an optical fiber.

* * * * *